Dec. 13, 1960  H. V. KELTON  2,964,215
PRESSURE COOKER VESSEL AND COVER SUPPORT THEREFOR
Filed July 13, 1959  2 Sheets-Sheet 1

INVENTOR.
HAROLD V. KELTON
BY
Lieber, Lieber & Nilles
Attorneys

Dec. 13, 1960 H. V. KELTON 2,964,215
PRESSURE COOKER VESSEL AND COVER SUPPORT THEREFOR
Filed July 13, 1959 2 Sheets-Sheet 2
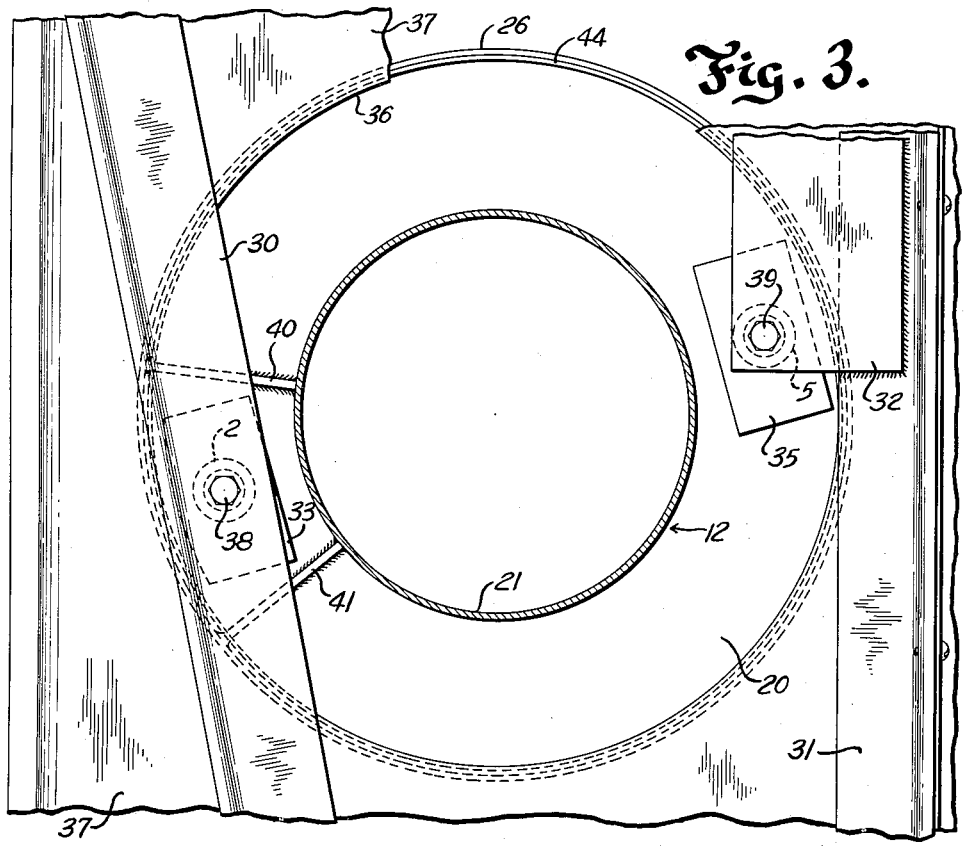
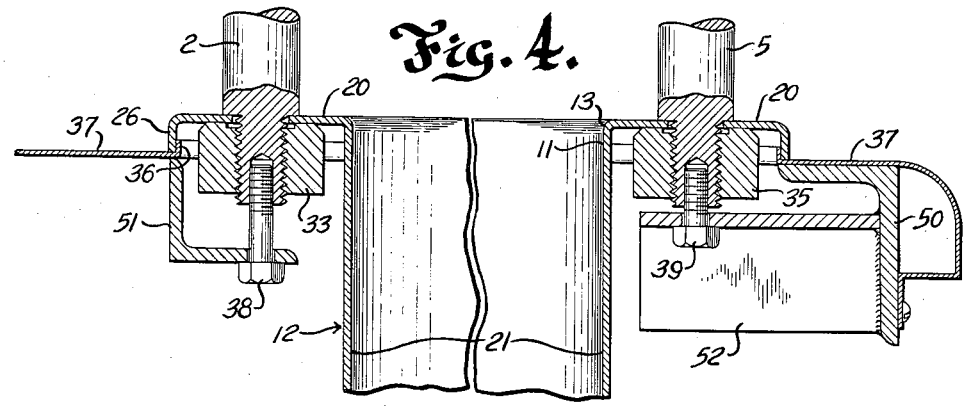
INVENTOR.
HAROLD V. KELTON
BY
Lieber, Lieber & Nilles
Attorneys

United States Patent Office 2,964,215
Patented Dec. 13, 1960

2,964,215

PRESSURE COOKER VESSEL AND COVER SUPPORT THEREFOR

Harold V. Kelton, South Beloit, Wis., assignor to Louis A. M. Phelan

Filed July 13, 1959, Ser. No. 826,529

2 Claims. (Cl. 220—57)

This invention relates to pressure cookers of the type in which the food is lowered into a hot cooking fat within a cylindrical vessel and a cover is lowered into the upper end of the vessel for pressure sealing engagement therewith. This cover is then locked in place to insure that the pressure, which is immediately built up within the sealed vessel, does not open the cover and blow out the vessel contents.

Cookers of this type utilize temperatures on the order of 350 degrees F. for the cooking fat and vessel pressures of 35 p.s.i. are commonplace. The diameter of these vessels are often in the neighborhood of 16 inches and therefore a considerable force acts on the cover tending to urge it out of the vessel. As a result, the cover must act to positively seal the vessel against escape of the hot fat and steam, and also be incapable of being opened until the vessel pressure has dropped below a predetermined minimum.

The covers for these cookers are necessarily heavy, large, hot and generally awkward to handle. Nevertheless, they must be so mounted to be easily and quickly opened or closed and in general be foolproof to operate.

In the copending United States application Serial Number 605,872, filed August 23, 1956, and entitled "Pressure Cooker," which issued on December 15, 1959, as Patent Number 2,917,200, of which subject matter I am co-inventor and over which the present invention is an improvement, there is disclosed a horizontally swingable yoke which supports a cover, the cover being vertically shiftable on the yoke by a lever-operated cam. The yoke is supported by vertical columns located along each side of the vessel, which columns in turn are secured together at their lower ends and act to support the vessel. With that construction, the columns are placed in tension when the vessel is pressurized and in effect the vessel is clamped by its ends in a surrounding framework. While that arrangement has proven highly satisfactory both from functional and commercial standpoints, it nevertheless is costly to manufacture because of the numerous parts and amounts of material required.

In the above cooker construction, the cover enters the upper end of the cylindrical vessel and has a sealing means on its periphery which slides in the smoothly finished upper end for sealing engagement therewith. The seal means must permit the cover to slide freely in the cylindrical sealing surface of the vessel and at the same time positively seal against the vessel pressure. It is therefore essential that the cylindrical sealing surface in the upper end of the vessel is perfectly concentric with the cover and its sealing means, and remains in that relationship notwithstanding the bumps or jars to which it may be subsequently subjected. The above said application discloses a reinforcing ring which is preferably shrink-fitted around the outside of an upper portion of the vessel to thereby insure and maintain the required concentricity of the vessel's internal sealing surface. That shrink ring also had apertures which served to guide the above mentioned side columns and accurately positioned the framework with respect to the vessel. That arrangement has proved to be highly satisfactory in function, but costly to manufacture and somewhat difficult to maintain with the desired degree of cleanliness.

Accordingly, the present invention provides a pressure vessel construction in which a radially extending flange is formed integrally with the upper end of the vessel, and at the same time the vessel itself is formed by a deep draw process. The resulting structure provides an economically produced vessel and, furthermore, one which is easily kept in a completely sanitary condition.

A more specific object of the invention is to provide a vessel of the above type in which a downwardly extending flange is formed around the outer edge of said radially extending and integrally formed flange so as to strengthen and rigidify the latter. Also, the additional downwardly extending flange cooperates with a complementary upwardly extending flange on a counter-top in which the vessel is mounted, and thereby provides a sanitary assembly in which flat or other foreign matter cannot drain into the cabinet and on the various parts located therein and cause unsanitary and fire-hazardous conditions.

Furthermore, and importantly, the invention provides a support structure for the swingable cover assembly, which structure is securely mounted on the integral and radial flange of the vessel. The arrangement is such that the vessel walls themselves are utilized to absorb the tension created by the pressure in the vessel, which pressure acts against the bottom and the cover of the vessel. Side column structures which extend to the bottom of the vessel and across its lower end have been eliminated and, instead of the vessel being, in effect, clamped by its top and bottom by means of that surrounding framework, the cylindrical vessel wall itself is placed in tension when the sealed vessel is pressurized.

Generally, the present invention provides an improved pressure cooker construction which is economical to produce, simple in construction, easy to clean and maintain in a clean condition, and efficient in performing the functions for which it was designed.

These and other objects and advantages will appear later as this disclosure progresses, reference being had to the accompanying drawings, in which:

Figure 3 is a bottom view taken generally along line 3—3 in Figure 2;

Figure 4 is a view similar to Figure 2 but showing a modified form of the invention.

Figure 1:
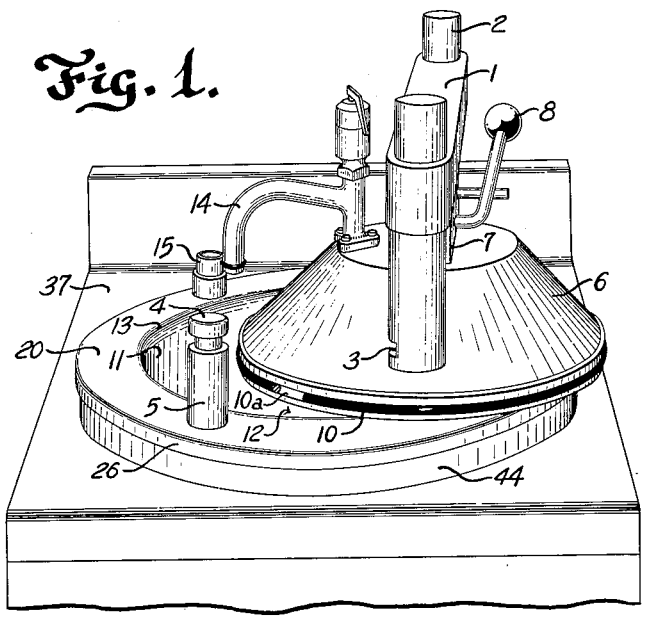
Figure 1 is a perspective view of a pressure cooker made in accordance with the present invention.

Referring in greater detail to the drawings, a horizontally swingable yoke 1 is pivoted on a vertical axis formed by pivot column 2 and has at its other end a T-shaped slot 3 which engages a complementary T-shaped portion 4 of the locking column 5. A cover 6 is vertically and shiftably mounted on the yoke and is positively moved up or down by the cam 7 and its associated operator lever 8. If a more complete description of the yoke and cover operating mechanism is desired, reference may be had to the said Patent Number 2,917,200. It is believed sufficient to say that the present invention also utilizes a horizontally swingable yoke for supporting the cover, which cover is positively shiftable in either vertical direction to open or close the vessel, and the vessel arrangement is such that the cover cannot be opened until pressure in the vessel had been reduced to at least a predetermined value.

The cover has a sealing means around its periphery which takes the form of an O-ring 10 mounted in a groove 10a. In Figure 1 the ring has been shown as being broken away for the purpose of clarity in showing its groove. The O-ring, however, is of one-piece construction. This ring sealingly slides within an upper internal sealing surface 11 of a cylindrical pressure vessel 12. This sealing surface is of a very smooth finish to prevent wear of the O-ring and insure positive sealing thereby.

As previously mentioned, a non-toxic and non-aqueous cooking fat in the vessel is often brought up to a temperature of 350 degrees F., or even higher, depending on the type of food being cooked. Many cooking operations are performed during the day in which a basket of food is immersed in this fat and, after a cooking period of a few minutes, is withdrawn from the fat. As this fat is used, it becomes progressively more foamy in nature. In other words, as the fat gets older it bubbles and foams to such an extent that it must be discarded and replaced with new, clean fat. The location of the exhaust port for such a cooker is therefore important because when the fat reaches such a condition that it rises in the vessel to level of the exhaust conduit, it will be lost when it passes through the conduit and require replacement. Furthermore, the fat will plug the conduit to prevent proper pressure release therethrough. It is therefore important to locate the exhaust port at the maximum possible height in the vessel because when the cooking fat reaches this port it must be replaced with new cooking fat.

One of the problems in using a vertically shiftable cover of the type shown in said Patent Number 2,917,200 and also utilized in the present invention, is in providing an exhaust port in the cover of the vessel and connecting the port with the rest of the cooker. Such a connection must be coupled and uncoupled without any attention on the part of the operator and the use of a flexible connection for this purpose has not been acceptable due, interalia, to sanitary requirements and heat and pressure problems. For such purposes, a conduit fitting 14 is carried by the cover and is engageable with a complementary stationary socket member 15 carried preferably on the cooker. For a more complete description of this exhaust means both as to structure and operation, reference may be had if desired to my copending United States application Serial Number 818,654, filed June 8, 1959, now Patent No. 2,942,753, issued on June 28, 1960, and entitled "Pressure Cooker With Vertically Shiftable Cover and Exhaust Therefor."

As the O-ring is slid over this surface many times, a proper sealing relationship between sealing area 11 and the ring 10 is absolutely essential for good life of the O-ring. It is also essential that the concentricity of the upper end of the vessel be maintained precisely so that the cover can move freely therein and at the same time insure that proper sealing action occurs.

With this sealing arrangement, once the O-ring has engaged the cylindrical sealing surface 11, it is in a position to effect a seal and pressure can immediately be built up within the vessel. Stated otherwise, the O-ring can provide the sealing function regardless of its precise vertical position along the sealing surface. Therefore, as soon as the O-ring moves downwardly past the rounded corner 13 of the vessel it begins its sealing function, and the rounded corner acts to compress the O-ring initially, to facilitate entry of the cover into the vessel.

In accordance with the present invention, an outwardly turned flange 20 is formed integrally with the side wall 21 of the vessel, the rounded corner 13 defining their point of juncture. This vessel 12 is formed preferably of stainless steel and by a deep-drawing process.

The vessel includes also an inclined bottom wall 22 which terminates in a sump 24 and a clean-out valve 25 at its extreme lower end, a more complete description of which may be found in the United States application Serial Number 705,173, filed December 26, 1957, entitled "Equalizer for Pressure Cookers," which issued on December 29, 1959, as Patent Number 2,918,861, and in which I am a co-inventor.

The outwardly extending flange 20 formed integrally around the periphery of the upper end of the cylindrical wall 21, is conveniently and economically formed during the process of deep-drawing the vessel proper. This flange is thus formed around the top of a truly circular vessel and insures that the internal cylindrical sealing surface, which may later be finished to the desired degree of smoothness, is also round.

Subsequent operations to make the vessel perfectly round in cross section and then to secure a separate flange thereto have all been eliminated.

The smooth round corner 13, which initially compresses the O-ring is also precisely formed at the time of deep-draw.

An additional flange 26, extending in a generally downward direction, is formed around the outer edge of flange 20 and serves to rigidify the flange which must support the cover and its support means, as will presently appear. This particular construction provides an inverted channel-shape cross section around the top of the vessel which results in a very strong and rigid structure.

The supporting framework in which the vessel is mounted and the cabinet top which cooperates therewith is constructed as follows.

Figure 2:
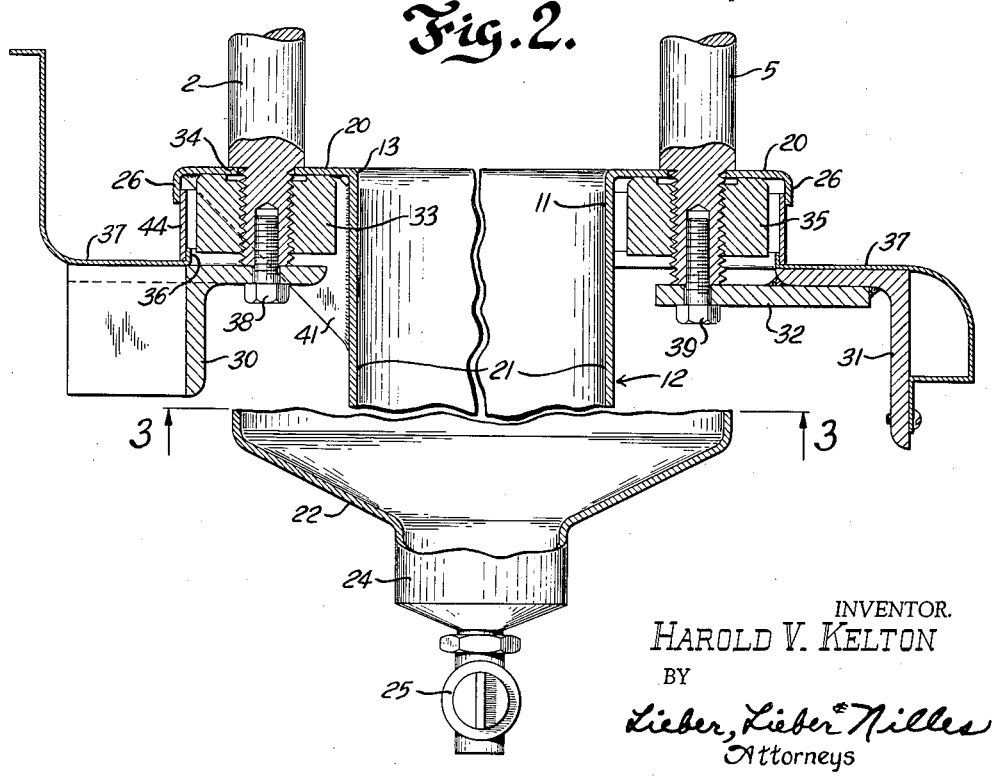
Figure 2 is an elevational view of the Figure 1 device on an enlarged scale and with parts being shown in section and broken away for clarity.

Referring to Figure 2, the support framework includes a pair of horizontally disposed angle iron members 30 and 31, and a plate 32 welded to member 31. The pivot column 2 has a reduced diameter portion which is in threaded engagement with the anchor block 33 and holds the flange 20 rigidly captive against the shoulder 34 on the column. Anchor block 35 similarly clamps the locking column 5 down on flange 20. Thus, the cover support is rigidly secured to the vessel.

The vessel is then placed in the framework and, more particularly, within the circular opening defined by the upwardly extending edge or flange 36 formed in the sheet metal counter top 37. The lower ends of the columns 2 and 5 rest directly on the angle member 30 and plate 32, respectively, and the weight of the vessel, cover and its support is thereby carried directly on the main support frame. Bolts 38 and 39 extend through angle 30 and plate 32 and threadably engage their respective columns to hold them securely in place.

As the pivot column must support the entire weight of the cover and its yoke, a considerable force is imposed on this column, tending to bend or twist the flange. In order to keep the flange square with the vessel wall at this point, a pair of gusset plates 40 and 41 are welded within the channel shaped vessel edge, one plate being located on either side of the pivot column. These plates provide the additional necessary rigidity required to hold the column securely.

The Figure 2 structure utilizes a sleeve 44 interposed between the flanges 26 and 36 and within the former but on the outside of the latter. Any fat from the vessel thus cannot leak into the cabinet where it can create a fire hazard. The sleeve is used to provide clearance under the valve 25 to facilitate cleaning of the vessel and at the same time not require the counter height to be excessive.

The modification shown in Figure 4 uses angle iron members 50, 51 and an angle bracket 52 as part of its support framework. In this structure, however, a sleeve is not utilized and the flange 26 rests directly on the counter top 37. The bolts 38, 39 act to pull their columns downwardly so that the flange 26 is tightly clamped down on the top, the latter being supported by the support framework.

By means of this invention, the vessel and its cover and support are rigidly secured together as a unit. When the vessel is pressurized, its side walls are placed in tension and thus utilized to absorb the forces due to the pressure instead of requiring additional framework for this purpose.

A vessel is provided with a truly round sealing surface and the integrally formed flange not only insures the required degree of roundness but also accurately supports the cover columns to insure proper operation of the cover and its seal.

The result is an economically produced pressure cooker which is highly efficient in operation and easily maintained in a sanitary condition.

Various modes of carrying out the invention are contemplated as being within the scope of the following claims particularly pointing out and distinctly claiming the subject matter which is regarded as the invention.

What is claimed and desired to be secured by Letters Patent is:

1. In combination, a pressure cooker vessel comprising, a deep drawn, sheet steel, cylindrical body having a bottom wall at its lower end, said body extending upwardly from said bottom wall and having around its upper end an outwardly extending peripheral flange, said flange being substantially at a right angle to the axis of said cylindrical body, a smoothly finished cylindrical sealing surface on the interior of the uppermost end of said cylindrical body and adjacent to said flange, cover support columns extending through diametrically opposed sides of said flange and rigidly secured thereto and extending thereabove, a cover support mounted for horizontal swinging on one of said columns and lockable with the other of said columns, and a cover including peripheral sealing means and mounted on said support for movement vertically relative thereto, said sealing means being sealingly engageable with said sealing surface.

2. In combination, a pressure cooker comprising a deep-drawn, sheet metal, cylindrical body terminating in an open upper end and having an outwardly extending peripheral flange formed integrally around said end and substantially at a right angle to the axis of said cylindrical body, a downwardly turned edge formed around the periphery of said flange, a smoothly finished cylindrical sealing surface on the interior of the uppermost end of said cylindrical body and adjacent said flange, cover support columns extending through diametrically opposed sides of said flange and rigidly secured thereto and extending thereabove, a cover support mounted on one of said columns for horizontal swinging thereon, said support being lockable with the other of said columns, a cover including peripheral sealing means and mounted on said support for movement vertically relative thereto, said sealing means being sealingly engageable with the said cylindrical sealing surface, and a counter top having an opening in which said body is mounted, said opening being defined by an upwardly turned rim in said counter top, the diameter of said flange being such in relation to said opening that said edge overlaps said rim.

References Cited in the file of this patent

UNITED STATES PATENTS

| | | |
|---|---|---|
| 1,305,702 | Ehlert | June 3, 1919 |
| 1,480,782 | Primeau | Jan. 15, 1924 |
| 1,667,114 | Hooker | Apr. 24, 1928 |
| 2,200,903 | Stephens | May 14, 1940 |
| 2,217,804 | McCormick | Oct. 15, 1940 |
| 2,483,256 | Berg | Sept. 27, 1949 |
| 2,572,963 | Wily | Oct. 30, 1951 |
| 2,581,892 | White | Jan. 8, 1952 |
| 2,772,016 | Bristol | Nov. 27, 1956 |